(12) United States Patent
El Hafidi et al.

(10) Patent No.: US 7,254,105 B2
(45) Date of Patent: Aug. 7, 2007

(54) METHOD AND APPARATUS FOR DIFFRACTIVE INFORMATION STORAGE

(75) Inventors: Idriss El Hafidi, Strasbourg (FR);
Romualda Grzymala, Strasbourg (FR);
Patrick Meyrueis, Strasbourg (FR);
Houssine El Soubari, Illkirch-Graffenstaden (FR)

(73) Assignee: Research Investment Network, Inc., Long Beach, CA (US)

( * ) Notice: Subject to any disclaimer, the term of this patent is extended or adjusted under 35 U.S.C. 154(b) by 521 days.

(21) Appl. No.: 10/497,823

(22) PCT Filed: Dec. 7, 2001

(86) PCT No.: PCT/EP01/15419

§ 371 (c)(1),
(2), (4) Date: Jun. 7, 2004

(87) PCT Pub. No.: WO03/049090

PCT Pub. Date: Jun. 12, 2003

(65) Prior Publication Data

US 2004/0264358 A1 Dec. 30, 2004

(51) Int. Cl.
*G11B 7/00* (2006.01)
(52) U.S. Cl. .............. 369/103; 369/112.1; 369/44.14
(58) Field of Classification Search ............... None
See application file for complete search history.

(56) References Cited

U.S. PATENT DOCUMENTS

| | | | |
|---|---|---|---|
| 3,947,640 A | 3/1976 | Ruell et al. | |
| 5,436,867 A | 7/1995 | Mok | |
| 5,519,517 A | 5/1996 | Redfield et al. | |
| 5,532,997 A | 7/1996 | Pauli | |
| 5,777,760 A * | 7/1998 | Hays et al. | 359/7 |
| 2002/0054402 A1* | 5/2002 | Klug et al. | 359/23 |
| 2006/0098260 A1* | 5/2006 | Newswanger et al. | 359/15 |

FOREIGN PATENT DOCUMENTS

| | | |
|---|---|---|
| EP | 0 588 344 A | 3/1994 |
| FR | 2 685 347 A | 6/1993 |
| WO | WO 96 38410 A | 12/1996 |

OTHER PUBLICATIONS

Ramenah H. et al.: "Digital Diffractive Optical Memories", Electronics, Circuits, and Systems, 1996, ICECS '96. Proceedings of the third IEEE International Conference on Rodos, Greece, Oct. 13-16 1996, New York, NY, USA, IEEE, US., Oct. 13, 1996 (Oct. 13, 1996), pp. 570-573, XP 010217063 - ISBN: 0 7803 3650 X.

H. J. Coufal, D. Psaltis and G. T. Sincerbox: "Holographic Data Storage", Springer, Berline XP002218093 243770, pp. 55-57.

* cited by examiner

*Primary Examiner*—Muhammad Edun
(74) *Attorney, Agent, or Firm*—Steve A. Wong; Caroline T. Do

(57) ABSTRACT

A petabyte diffractive storage system stores information on a diffractive storage tape. A light component generates a large reference beam to cover the plurality of points of the diffractive storage tape so as to simultaneously interfere with the plurality of object beams creating a plurality of packets of information at the plurality of points. Also disclosed is a terabyte diffractive storage that system reads information from a diffractice storage disk having a plurality of tracks. A plurality of micro-mirrors directs the read beam to one of said plurality of tracks.

100 Claims, 7 Drawing Sheets

METHOD AND APPARATUS FOR DIFFRACTIVE INFORMATION STORAGE

CROSS-REFERENCE TO RELATED APPLICATIONS

This Application relates to the applications entitled:
PHOTONICS DATA STORAGE SYSTEM USING A POLYPEPTIDE MATERIAL AND METHOD FOR MAKING SAME (PCT/FR01/02386) filed on Jul. 20, 2001.

FIELD OF INVENTION

The present invention generally relates to a large volume diffractive memory. In particular, the present invention relates to an apparatus for reading information from and recording information to a petabyte tape diffractive memory and a terabyte disk diffractive memory.

BACKGROUND OF THE INVENTION

The large storage capacities and relative low costs of CD-ROMS and DVDs have created an even greater demand for still larger and cheaper optical storage media. Holographic memories have been proposed to supersede the optical disc as a high-capacity digital storage medium. The high density and speed of the holographic memory comes from three-dimensional recording and from the simultaneous readout of an entire packet of data at one time. The principal advantages of holographic memory are a higher information density ($10^{11}$ bits or more per square centimeter), a short random access time (~100 microseconds and less), and a high information transmission rate ($10^9$ bit/sec).

In holographic recording, a light beam from a coherent monochromatic or multispectral source (e.g., a laser) is split into a reference beam and an object beam. The object beam is passed through a spatial light modulator (SLM) and then into a storage medium. The SLM forms a matrix of shutter (in the binary case) or, more generally, a matrix of photocells modulating the light intensity that represents a packet of data. The object beam passes through the SLM which acts to modulate the object beam with the binary information being displayed on the SLM. The modulated object beam is then directed to one point on the storage medium by a beam processor where it intersects with the reference beam to create a hologram representing the packet of data.

An optical system consisting of lenses and mirrors is used to precisely direct the optical beam encoded with the packet of data to the particular spatially addressed area of the storage medium. Optimum use of the capacity of a thick storage medium is realized by spatial and angular multiplexing. In spatial multiplexing, a set of packets is stored in the storage medium shaped into a plane as an array of spatially separated and regularly arranged subholograms by varying the beam target in the x-axis and y-axis of the plane. Each subhologram is formed at a point in the storage medium with the rectangular coordinates representing the respective packet address as recorded in the storage medium. In angular multiplexing, recording is carried out by keeping the x- and y-coordinates the same while changing the irradiation angle of the reference beam in the storage medium. By repeatedly incrementing the irradiation angle, a plurality of packets of information is recorded as a set of subholograms at the same x- and y-spatial location.

Previous techniques for recording information in a highly multiplexed volume holographic memory, and for reading the information out are limited in memory capacity. In particular, data storage using magnetic, magneto optic, and optic technology is limited to a capacity that most likely will not go beyond 1 terabyte per unit. Most of the current advanced commercial products are in the range of 100 gigabytes. The need for terabyte and petabyte mass storage is becoming evident for hospital applications, for picture storage, mapping (the whole word map on a tape), defense, Internet, database, meteorology, and so forth.

It is therefore an object of the present invention is to provide an apparatus for reading a diffractive memory capable of a storage capacity ranging from terabyte to petabyte mass tape and disk storage.

It is a further object of the present invention is to provide a massive petabyte tape storage system. It is still a further object of the present invention to provide a massive terabyte disk storage system.

Further objects and advantages of the present invention will become apparent from a consideration of the drawings and ensuing description.

SUMMARY OF THE INVENTION

In order to achieve the above-mentioned objectives, the present invention comprises a plurality of object beams focused simultaneously onto a plurality of points of a diffractive storage tape. A coherent light source generates a large reference beam to cover the plurality of points of the diffractive storage tape so as to simultaneously interfere with the plurality of object beams storing a plurality of packets at the plurality of points. In an embodiment of the present invention, the diffractive storage tape has a layer of polypeptide positioned thereon capable of storing information. In an embodiment of the present invention, a substrate of the diffractive storage tape is made of a polymer (e.g., polyester) with a thickness of about $\frac{1}{10}$ of a millimeter and has coated thereon a polypeptide layer of about 30 microns with a tolerance of about 5 microns.

In a further aspect of the present invention, a rotating mirror deflects the large reference beam. A multiplexing device receives the deflected large reference beam from the rotating mirror. The multiplexing device then directs the large reference beam at one of a plurality of angles to cover the plurality of points of the diffractive storage tape. A cylindrical lens forms the large reference beam from a coherent light source. A plurality of spherical lenses directs the plurality of object beams onto the diffractive storage tape. In another embodiment, a single spherical lens is configured to focus the plurality of object beams onto the diffractive storage tape. In another aspect of the present invention, the multiplexing device directs the large reference beam at a predetermined angle so as interfere with the plurality of object beams to store a plurality of packets at the plurality of points.

In still another aspect of the present invention, the multiplexing device comprises a plurality of mirrors wherein each of the mirrors directs the large reference beam to one of a plurality of angles so that the reference beam interferes with the plurality of object beams to produce a plurality of packets at the plurality of points. Each of the points is a physical position identifiable by its rectilinear Cartesian coordinate on the diffractive storage tape.

In yet a further aspect of the present invention, in a reading phase, the coherent light source generates the large reference beam to illuminate the plurality of points of the diffractive storage tape so as to simultaneously reconstruct a plurality of read beams creating a plurality of packets at the plurality of points. A plurality of detectors is configured to receive the plurality of read beams.

In still another aspect of the present invention, the diffractive storage tape comprises a plurality of tracks where each of the plurality of object beams focuses onto each of the tracks, respectively, so as to interfere with the large reference beam forming the plurality of points thereon.

In a further aspect of the present invention, a coherent light source generates a large reference beam to illuminate a plurality of points of the diffractive storage tape so as to simultaneously reconstruct a plurality of read beams reconstructing a plurality of packets at the plurality of points. A plurality of detectors is configured to receive the plurality of read beams.

In yet another aspect of the present invention, the diffractive storage tape has a layer of polypeptide positioned thereon capable of storing information.

In still another aspect of the present invention, a rotating mirror deflects the large reference beam. A multiplexing device receives the deflected large reference beam from the rotating mirror which then directs the large reference beam at one of a plurality of angles to cover the plurality of points of the diffractive storage tape.

In yet another aspect of the present invention, there is a plurality of spherical lenses, each of the lenses focusing one of the read beams onto one of the detectors.

In a further aspect of the present invention, the diffractive storage tape has a layer of polypeptide thereon capable of storing information. The polypeptide layer is about 30 microns with a tolerance of about 5 microns. A substrate of the diffractive storage tape is made of a polymer (e.g., a polyester) with a thickness of about $\frac{1}{10}$ of a millimeter and has coated thereon a polypeptide layer of about 30 microns with a tolerance of about 5 microns.

In yet a further aspect of the present invention, each of the object beams has modulated thereon its own plurality of pixels.

In still a further aspect of the present invention, a rotating mirror deflects the large reference beam. A multiplexing device receives the deflected large reference beam from the rotating mirror which then directs the large reference beam at one of a plurality of angles to cover the plurality of points of the diffractive storage tape.

In an aspect of the present invention, an apparatus and method are presented for reading information by reflection from a diffractive storage disk having a plurality of concentric tracks storing the information. A coherent light source is configured to generate a read beam. The coherent light source may be a spatially (partially) coherent light source (e.g., LED) in addition to that of a spatially and temporarily coherent light source (laser). In addition, in the case of a reflection hologram, a spatially coherent white light (a small light bulb with a simple reflector) can be used. A plurality of micro-mirrors directs the read beam to a point on one of the plurality of tracks. A detector is configured to detect a diffractive portion of the read beam reflected from the diffractive storage disk from the point on one of the tracks of the diffractive storage disk.

In a further aspect of the present invention, a lens combination is configured to collimate the read beam from the coherent light source so that the read beam arrives at the array of micro-mirrors is a parallel beam.

In still another aspect of the present invention, the lens combination comprises a condenser which focuses the read beam from the coherent light source to a focal point and a lens situated at the focal point converts the read beam to a parallel form. If the coherent light source is a laser, then a condenser is not necessary because the laser beam is already parallel. In an embodiment of the present invention, the detector is a CCD camera. The plurality of micro-mirrors is a micro electro-optical mechanical system (MEOMS).

In a further aspect of the present invention, the diffractive storage disk has a layer of polypeptide thereon capable of storing information. The polypeptide layer is about 30 microns with a tolerance of about 5 microns. A substrate of the diffractive storage disk is made of a substrate of the polymer family (e.g., a polyester) with a thickness of about $\frac{1}{10}$ of a millimeter and has coated thereon a polypeptide layer of about 30 microns with a tolerance of about 5 microns.

In yet a further aspect of the present invention, each of the micro-mirrors directs the read beam to a selected one of a plurality of angles so that the read beam impinges on the point of the optical disk at the selected angle in order to illuminate a packet. The packet is a subhologram representation of information. The point is a physical position identifiable by its rectilinear coordinate on the diffractive storage disk.

In still another aspect of the present invention, an apparatus and method are presented for reading information by transmission from a diffractive storage disk having a plurality of tracks. A coherent light source is configured to generate a read beam. A plurality of micro-mirrors directs the read beam to a point on one of the plurality of tracks. A detector is configured to detect a diffractive portion of the read beam transmitted through the diffractive storage disk from the point on one of the tracks of the diffractive storage disk.

In a further aspect of the present invention, a lens combination is configured to collimate the read beam from the coherent light source so that the read beam arriving at the array of micro-mirrors is a parallel beam.

In still another aspect of the present invention, the lens combination comprises a condenser which focuses the read beam from the coherent light source to a focal point and a lens situated at the focal point converting the read beam to a parallel beam. The detector is a CCD camera and the plurality of micro-mirrors is a micro electro-optical mechanical system (MEOMS).

In an aspect of the present invention, a hybrid apparatus and method are presented for reading information from a diffractive storage disk having a plurality of tracks. A coherent light source is configured to generate a read beam. A plurality of micro-mirrors directs the read beam to a point on one of the plurality of tracks. A first detector is configured to detect a diffractive portion of the read beam reflected from the point of one of the tracks. A second detector is configured to detect a diffractive portion of the read beam transmitted through the diffractive storage disk from the point on one of the tracks of the diffractive storage disk.

A more thorough disclosure of the present invention is presented in the detailed description which follows and the accompanying drawings.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF THE INVENTION

Recording Process

Figure 1:
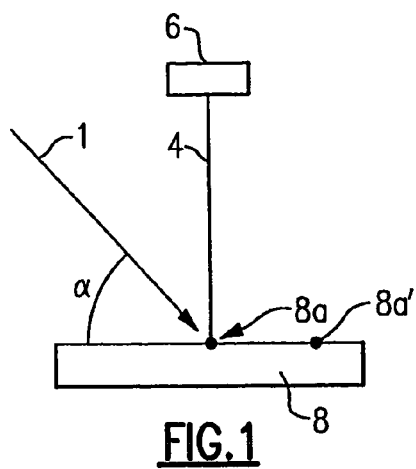
FIG. 1 is a schematic diagram illustrating the process of diffractive recording.

FIG. 1 shows a schematic of the important signals involved in recording a diffraction pattern, or alternately a hologram, in a storage medium using angular and spatial multiplexing. Various diffractive recording processes have been developed in the art and further details can be found in the book *Holographic Data Storage*, Springer (2000) edited by H. J. Coufal, D. Psaltis, and G. T. Sincerbox. In forming a hologram, a reference beam 1 intersects with an object beam 4 to form a sub-hologram 8a (referred to alternately as a point) extending through the volume of storage medium 8. There is a separate sub-hologram or point 8a extending through the volume for each angle and spatial location of the reference beam 1. The object beam 4 is modulated with a packet of information 6. The packet 6 contains information in the form of a plurality of bits. The source of the information for the packet 6 can be a computer, the Internet, or any other information-producing source. The hologram impinges on the surface 8a of the storage medium 8 and extends through the volume of the storage medium 8. The information for the packet 6 is modulated onto the storage medium 8 by spatial multiplexing and angle multiplexing. Angle multiplexing is achieved by varying the angle $\alpha$ of the reference beam 1 with respect to the surface plane of the storage medium 8. A separate packet 6 of information is recorded in the storage medium 8 as a sub-hologram for each chosen angle $\alpha$ and spatial location. Spatial multiplexing is achieved by shifting the reference beam 1 with respect to the surface of the storage medium 8 so that the point 8a shifts to another spatial location, for example point 8a', on the surface of the storage medium 8.

The storage medium 8 is typically a three-dimensional body made up of a material sensitive to a spatial distribution of light energy produced by interference of the object light beam 4 and the reference light beam 1. A hologram may be recorded in a medium as a variation of absorption or phase or both. The storage material must respond to incident light patterns causing a change in its optical properties. In a volume hologram, a large number of packets of data can be superimposed, so that every packet of data can be reconstructed without distortion. A volume (thick) hologram may be regarded as a superposition of three dimensional gratings recorded in the depth of the emulsion each satisfying the Bragg law (i.e., a volume phase grating). The grating planes in a volume hologram produce change in refraction and/or absorption.

Several materials have been considered as storage material for optical storage systems because of inherent advantages. These advantages include a self-developing capability, dry processing, good stability, thick emulsion, high sensitivity, and nonvolatile storage. Some materials that have been considered for volume holograms are photofractive crystals, photopolymer materials, and polypeptide material.

Figure 2:
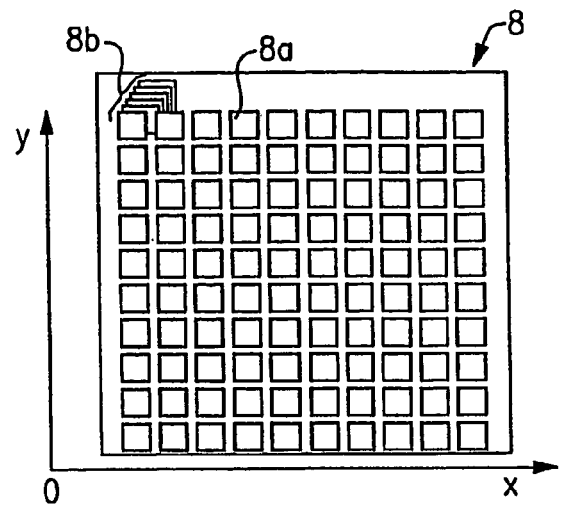
FIG. 2 is a schematic representation of a matrix of points formed in a storage medium.

FIG. 2 shows in greater detail the storage medium 8 arranged in the form of a flat sheet, herein referred to as a matrix. In this example, the matrix is 1 $cm^2$. Each of a plurality of points on the matrix is defined by its rectilinear coordinates (x, y). An image-forming system (not shown) reduces the object beam 4 to the sub-hologram 8a having a minimum size at one of the x, y point of the matrix. A point in physical space defined by its rectilinear coordinates contains a plurality of packets 8b.

In this case, a 1 $mm^2$ image 8a is obtained by focusing the object beam 4 onto the storage medium 8 centered at its coordinate. Due to this interference between the two beams 1,4, a diffractive image 8a 1 $mm^2$ in size is recorded in the storage material 8 centered at the coordinates of the matrix. Spatial multiplexing is carried out by sequentially changing the rectilinear coordinates. The object beam 4 focuses on the storage material 8 so that a separate image 8a is recorded at a unique position in the plane defined by its coordinates (x, y). This spatial multiplexing results in a 10 by 10 matrix of diffractive images 8a. Angle multiplexing is carried out by sequentially changing the angle of the reference beam 1 by means of mirrors (not shown). Angle multiplexing is used to create 15-20 packets of information 8b corresponding to 15 discrete variations of the angle of incidence of the reference beam. Experimental results show that 25 multiplexing angles are possible and this can be doubled, by a symmetric set-up to 50 angles. A data packet is reconstructed by shinning the reference beam 1 at the same angle and spatial location in which the data packed was recorded. The diffractive portion of the reference beam 1 diffracted by the storage material 8 forms the reconstruction, which is typically detected by a detector array. The storage material 8 may be mechanically shifted in order to store data packets at different points by its coordinates (x, y).

The same principal of multiplexing illustrated above for a matrix applies to other geometric configurations of packets. For example, the packets are arranged along concentric tracks of an optical disk or are arranged into parallel tracks in an optical tape. For the optical tape, the recording instead of being a matrix of points will be a succession of parallel tracks having a plurality of points recorded on each track. For the optical disk, the recording will be a plurality of concentric tracks having a plurality of points recorded on each track.

Figure 2A:
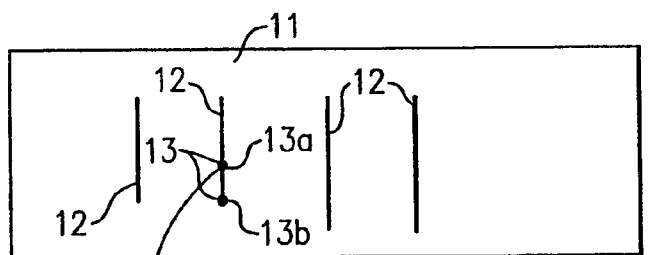
FIG. 2a represents a format of a tape media.
Figure 2A:
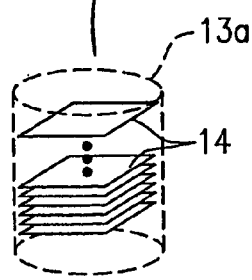

Referring now to FIG. 2a, there is illustrated a top view of one section of a tape media 11. The tape media 11 is shown having disposed thereon a plurality of vertical slices 12 perpendicular to the tape motion on which are stored a plurality of points 13, two examples of which are denoted by 13a, 13b. Angle multiplexing is used to create a plurality packets of information 14 at each point 13 corresponding to discrete variations of the angle of incidence of the reference beam. Although the stacks 14 are illustrated as being at different depths in the illustration of FIG. 2a, it should be understood that the interference gratings actually overlap each other and occupy substantially the same space in the storage region 13a.

Figure 2B:
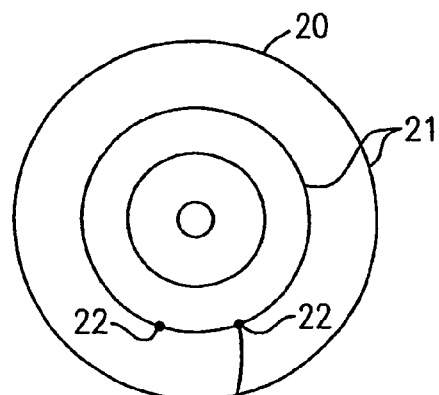
FIG. 2b represents a format of a disk media.
Figure 2B:
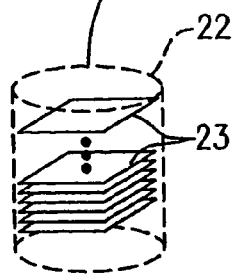

Referring now to FIG. 2b, there is illustrated a top view of one section of a disk media 20. The disk media 20 is shown having disposed thereon a plurality of concentric tracks 21 on which are stored a plurality of points 22. This is a form of spatial multiplexing. Angle multiplexing is used to create a plurality of packets of information 23 at each point 22 corresponding to discrete variations of the angle of incidence of the reference beam. Although the stacks 23 are illustrated as being at different depths in the illustration of FIG. 2b, it should be understood that the interference gratings actually overlap each other and occupy substantially the same space in the storage region 22.

Tape Storage System

Figure 3:
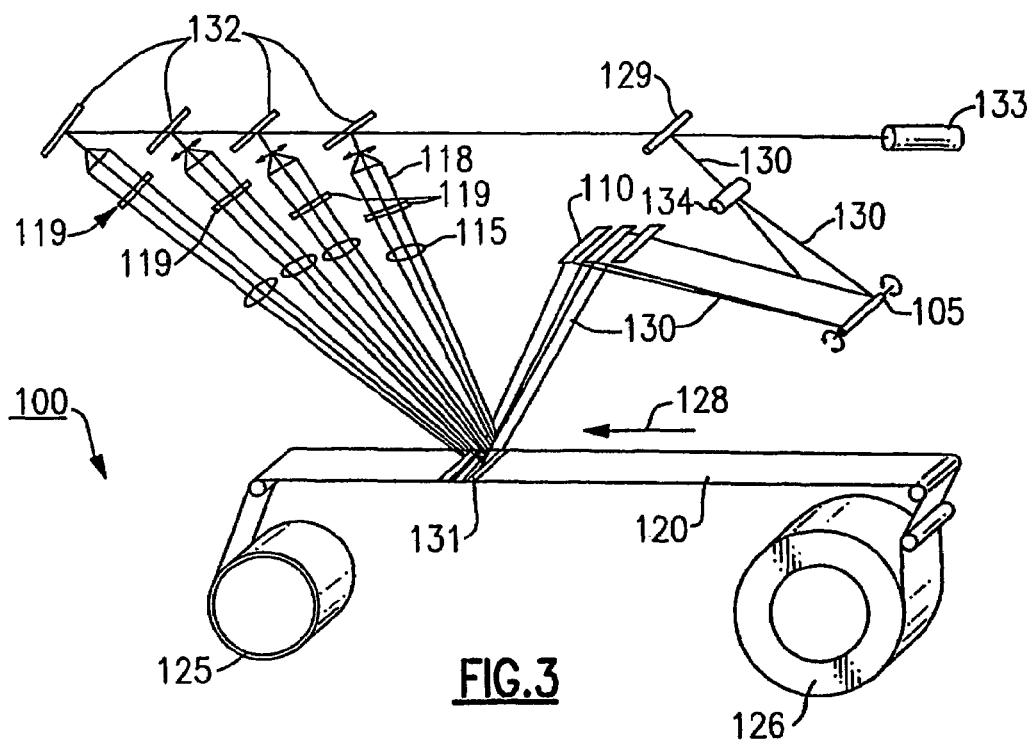
FIG. 3 shows an apparatus for recording information to a petabyte storage tape according to the present invention.

FIG. 3 shows a petabyte diffractive memory recording system 100 according to the present invention in which diffractive patterns, or alternately holograms, are recorded in a moving diffractive memory medium 120. As shown in FIG. 3, the memory medium 120 is in the form of a tape. The diffractive memory recording system 100 comprises the diffractive storage tape 120 mounted on a set of tape coils 125, 126 which move the diffractive storage tape 120 in the direction 128.

The storage tape 120 may be made of photopolymer materials, polypeptide material, and other such materials for optical recording. With a photopolymer the density storage will be much more limited than by using a polypeptide with a shorter life duration and a higher SNR and a lower tolerancing. Thus, preferably, the storage tape 120 is made of a polypeptide material. An embodiment of a polypeptide material suitable for the storage tape 120 is disclosed in the application PHOTONICS DATA STORAGE SYSTEM USING A POLYPEPTIDE MATERIAL AND METHOD FOR MAKING SAME (PCT/FR01/02386) filed on Jul. 20, 2001 and incorporated herein.

In one embodiment of the present invention, the thickness of the polypeptide layer of the tape 120 is 30 microns with a tolerance of 5 microns. The substrate on the tape 120 is made of a polymer, for example, polyester, with a thickness of 1/10 of a millimeter. The diffractive storage tape 120 is not limited to these dimensions for the polypeptide layer and substrate.

The diffractive storage tape 120 is capable of storing a petabyte of information. A petabyte is a quadrillion bytes (10**15). The petabyte tape system is designed for professional use where a large amount data has to be stored within a small volume. For example, by using a one petabyte tape, it is possible to store on a magnetic tape one week of imaging (e.g., Xrays, positron, NMR, thermography) produced by a large hospital in a non-compression format. The non-compression format allows the images to be stored without compression which some physicians do not like because it removes details from the picture.

A point 121 is a specific location on the surface of the diffractive storage tape 120 referred to by its Cartesian coordinates. The point 121 contains one or more packets recorded onto the diffractive storage tape by angular multiplexing. Each packet comprises a different sub-hologram. For example, 50 packets would be multiplexed onto one of the points at 50 different angles. Each packet holds the information of a plurality of pixels derived from an information source.

The coherent light source 133, for example, a laser, is shown generating a light beam which impinges on beam splitter 129 which splits the light beam into a reference beam 130 and an a beam of light which is further split by beam splitters 132 to form a plurality of object beams 118. The reference beam 130 is directed through a cylindrical lens system 134 and reflects off of a rotating mirror 105 to a multiplexing device 110. The micro-mirror array 110 comprises a linear array of DMD (Digital Micro-mirror Device) like micro-mirrors MEOMS (Micro Opto Electro Mechanical System). In an alternate embodiment, the rotating mirror 105 can also be combined with the micro-mirror array 110.

The beam 130 is a large reference beam meaning that it has a width with the ability to cover more than one point on the tape medium 120 by forming a column 131 on the tape medium 120. The large reference laser beam 130 is formed using a cylindrical lens 134 that will provide a wide beam shape (as opposed to a focus point which would be output from a spherical lens). The wide beam shape is configured to be parallel to the rotating mirror 105.

The array of micro-mirrors 110 focuses the reference beam 130 onto the column 131 covering one or more points of the diffractive tape 120. The mirror 105 reflect the beam 130 to the array of stable micro-mirrors 110. Each of the mirrors 110 will have a rectangular aperture configured to fit the laser beam profile that is also rectangular. Each of the mirrors 110 is oriented to reflect the beam 130 at a one of the multiplexing angles. This implements angular multiplexing. The mirror 105 rotates in such a way as to select the angular multiplexing mirror 110. The beam 130 is reflected by one of the mirrors 110 and the beam 130 is thus positioned to address the tape 120 with the appropriate angle at the appropriate location.

The multiplexing device 110 comprises a plurality of micro-mirrors. The implementation of angle multiplexing is illustrated in FIG. 3c where the rotating mirror 105 is shown rotated to position 105a so that light beam 130 reflects off the mirror 105 at the position 105a to form the light beam 130a which in turn reflects off of the mirror 110a to a point 121 at an angle 131a with respect to the diffractive storage tape 120. The rotating mirror 105 is then shown rotated at another position 105b so that light beam 130 reflects off of the mirror 105 at the position 105b to form the light beam 130b which in turn reflects off of the mirror 110b to a point 121 at a different angle 131b with respect to the diffractive storage tape 120. By the same principal, the light beam 130 may be positioned at a point of the diffractive tape 120 at one of N angles as directed by one of N mirrors 110 where N is the number of mirrors. Thus, angular multiplexing is implemented. Spatial multiplexing is implemented by moving the tape to a new position using coils 125, 126.

The plurality of object beams 118 modulated with information coming from, for example, a plurality of spatial light modulators 119 are focused by a plurality of spherical lenses 115 forming Fourier transforms onto a plurality of points on the column 131 (FIG. 3b) of the tape medium 120 where they intersect with the large reference beam 130 forms in the recording material of the optical tape 120 a plurality of packages at the plurality of points 121. FIG. 3b shows an embodiment of a format for the diffractive storage tape 120 according to the present invention. The plurality of points 121 are formed on one of a plurality of rows 131 perpendicular to the motion of the diffractive tape storage 120. A plurality of packages are stored at each of the points 121 through angular multiplexing. Each package contains information, i.e. a plurality of bits. The tape is incremented in the direction of the tape motion to store information at another of the rows 131. The points form tracks 132.

The object beams 118 are realized for parallel recording on ten tracks. There is one beam for each of the tracks 132. Each of the object beams 118 is collimated after a splitting of the initial laser beam in the ten object beams 118 by using an optimized beam splitter or by using digital diffractive components that configured for having an optimal effect. The ten output object beams 118 are collimated by using divergent and convergent lenses well known in the prior art. Each of the object beams 118 goes through its own individual SLM 119 loaded with data. The object beams 118 coming from the SLMs 119 are focused using Fourier lens onto the tape at the programmed location. Thus, a column 131 is formed by the ten points recorded at specific locations on the tape 120 as the interference patterned formed by the intersection of the ten object beams 118 and the large reference beam 130.

Figure 3A:
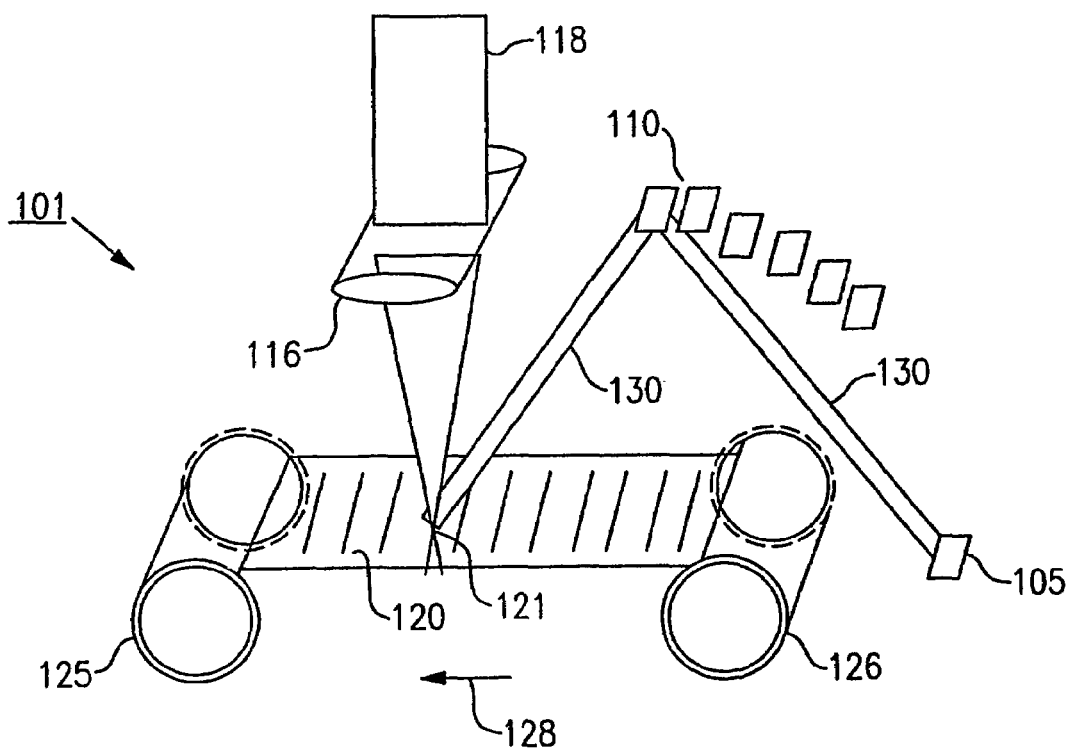
FIG. 3a shows an apparatus for recording information to a petabyte tape storage using a single spherical lens according to the present invention.
Figure 3B:
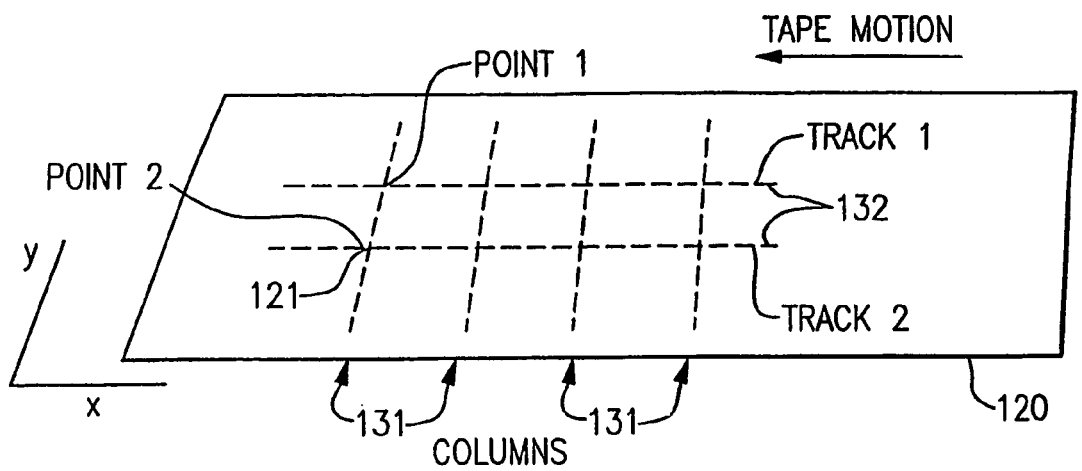
FIG. 3b shows a format for storage of information on a diffractive tape according to the present invention.
Figure 3C:
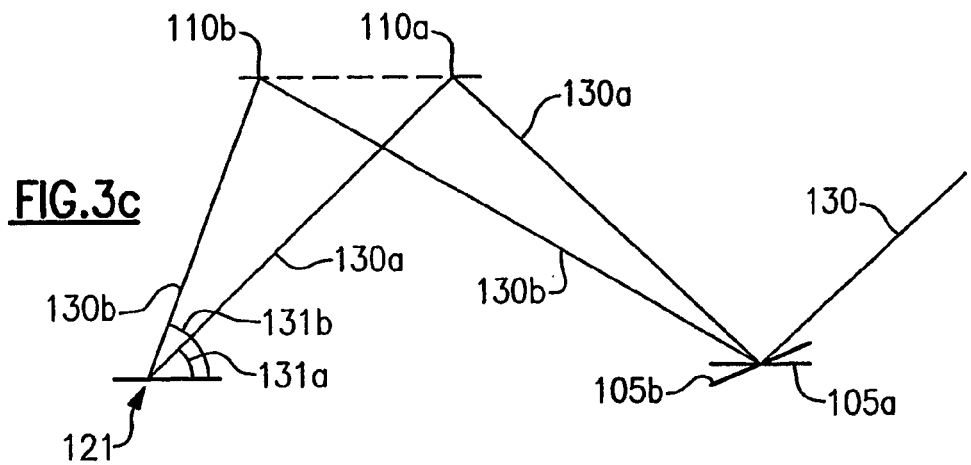
FIG. 3c shows how the addressing system works according to the present invention.
Figure 3D:
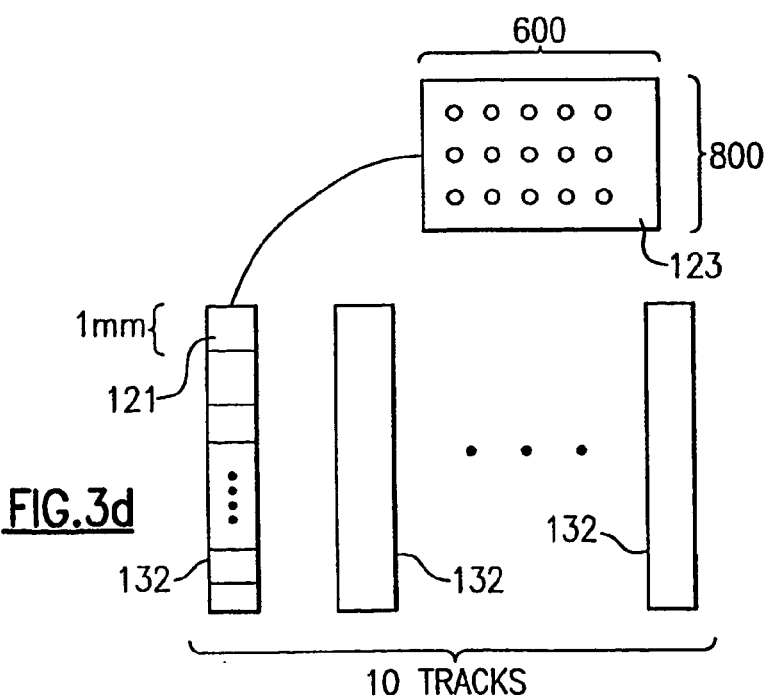
FIG. 3d shows the format for storing information on the diffractive storage tape according to the present invention.

The format of the petabyte tape system 120 is shown in FIG. 3*d* for the situation where there are ten tracks 132. In this example, the tape and consequently each of the tracks 132 is 5 km long. Each track has a width of 1 mm. A packet of information is stored in a 1 mm×1 mm section of the tape 121 (a point) wherein each page is spatially multiplexed at points of the 1 mm×1 mm square. A packet 123 contains the information from 800 rows by 600 columns of pixels modulated onto the object light beam by a spatial light modulator. Angular multiplexing is configured to produces 25 separate angles. By the use of hypermultiplexing, 50 packets per point is achievable using, for example, two different wavelengths. This results in approximately 0.02 Gbytes on a 1 mm×1 mm square (800×600×50). Thus one meter of length of the tape has 20 Gbytes per track. One kilometer of tape stores 20 terabytes on one track. The 10 tracks on a one-kilometer tape thus store a total of 200 terabytes. The data for a five-kilometer length of tape with 10 tracks stores 1 petabyte of information.

FIG. 3*a* shows a tape reading system 101 which is an alternate embodiment of the tape reading system 100 wherein the plurality of spherical lenses 115 of FIG. 3 are replaced by the single spherical lens 116.

Figure 4:
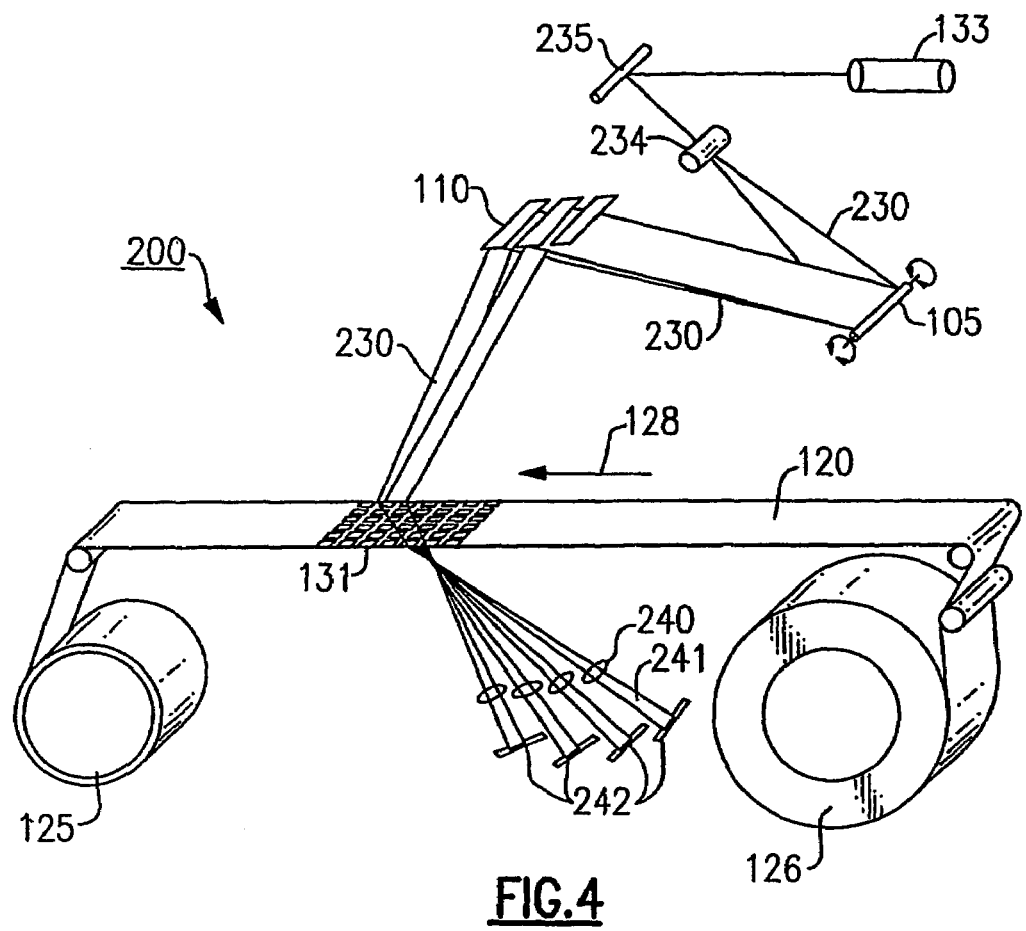
FIG. 4 shows an apparatus for reading information from a petabyte storage tape according to the present invention.

FIG. 4 shows a petabyte diffractive memory reading system 200 according to the present invention in which diffraction patterns, or alternately holograms, are recorded in a moving diffractive memory medium 120. As shown in FIG. 4, the memory medium 120 is in the form of a tape. The diffractive memory reading system 200 comprises the diffractive storage tape 120 mounted on a set of tape coils 125, 126 which move the diffractive storage tape 120 in the direction 128.

The diffractive recording apparatus 100 and the diffractive reading apparatus 200 have the following components in common: the rotating mirror 105, the multiplexing device 110, the diffractive storage tape 120, and the tape coils 125, 126. In the diffractive reading apparatus 200, the read beam 230 is addressed by the same principals as the record beam 130 as shown in FIGS. 3*b*, 3*c*.

The coherent light source 133 is shown generating a light beam which impinges on a mirror 235 which reflects the light beam through a cylindrical lens optical system 234 to form a read beam 230 having a wide shape. The read beam 230 generated from the coherent light source 133 reflects off of the rotating mirror 105 to the multiplexing device 110 for track selection. The read beam 230 is a large reference beam meaning that it has a width with the ability to cover more than one point on the tape medium 120. The multiplexing device 110 focuses the reference beam 230 onto one or more points 121 of the diffractive tape 120.

The multiplexing device 110 focuses the read beam 230 onto one of a plurality of tracks 132 located on the diffractive memory 120. The reference beam 230 transmits through the diffractive memory 120 and is focused by one of a plurality of lenses 240 to produce one of a plurality of object beams 241 onto one of a plurality of multi-channel detectors 242. The recording apparatus 100 and the reading apparatus 200 may be combined into one apparatus having elements in common, or may be two separate apparatuses.

Disk Storage System

Figure 5:
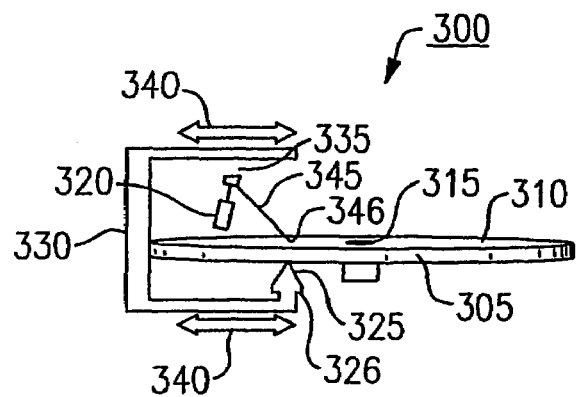
FIG. 5 shows a perspective view of an apparatus for terabyte diffractive disk according to the present invention.

FIG. 5 shows a perspective view of a terabyte data storage disk system 300 usable in a mini disk format or a mega disk format. The terabyte data storage disk comes in a reflective version 400 (FIG. 6*a*), a transmission version 500 (FIG. 7), and a hybrid version 600 (FIG. 8).

The storage disk 400, 500, 600 may be made of photopolymer materials, polypeptide material, and other such diffractive materials. With a photopolymer the density storage will be much more limited than by using a polypeptide with a shorter life duration and a higher SNR and a lower tolerancing. Thus, preferably, the storage tape 120 is of a polypeptide material. An embodiment of a polypeptide material suitable for the storage tape 120 is disclosed in the application PHOTONICS DATA STORAGE SYSTEM USING A POLYPEPTIDE MATERIAL AND METHOD FOR MAKING SAME (PCT/FR01/02386) filed on Jul. 20, 2001 and incorporated herein. The diffractive storage disk 400, 500, 600 is preferably constructed from a polypeptide material. In one embodiment, the optical disk 400, 500, 600 has a thickness of the polypeptide layer of 30 microns with a tolerance of 5 microns. The diffractive optical disk is not limited to these dimensions for the polypeptide layer and substrate. The diffractive storage disk is capable of storing a terabyte of information. A terabyte is a trillion (10\*\*12) bytes.

The disks 400, 500, 600 have a capacity of 5 to 10 terabyte assuming a 30 cm diameter. At this dimension, there is an available usable surface area of 250,000 square millimeters. The optical density is 0.02 gigabyte per square millimeter. Thus, it is possible to obtain 5 terabyte for these disks. It is likewise possible to obtain 10 terabytes by printing the disk on both faces as in hybrid disk 600. This is equivalent to about 1000 standard movies at the MPEG format.

A point is a specific location on the surface of the diffractive storage tape 120 referred to by its rectilinear Cartesian coordinates. A point contains one or more packets recorded onto the diffractive storage tape by angular multiplexing. Each packet is stored as a different sub-hologram. For example, 50 packets would be multiplexed onto the point at 50 different angles. Each packet holds the information of a plurality of pixels derived from an information source. The format of the optical disk is described above in the section related to FIG. 2*b*.

The MEOMS 435, 535, 635 comprises an array of micromirrors 110 which address angularity the read beam onto a point of the diffractive disk. Each of the micro-mirrors of the MEOMS is oriented to reflect the read beam at a one of the multiplexing angles. This implements angular multiplexing.

As shown in FIG. 5, the terabyte data storage disk 300 comprises a carriage 330, a compact laser 320, a MEOMS (micro electro-optical mechanical systems) actuator 335, a disk 305, and a detector such as a CCD (charge coupled device) 325. The disk 305 spins around the rotation axis 315. The carriage 330 has the MEOMS actuator 335, the compact laser 320, and the CCD detector 325 attached thereto so that when the carriage 330 moves in a translation direction 340 a laser beam 345 forms a spot 346 on the moving disk surface 310. The energy of the beam 345 transmits through the rotating disk 305 to form a beam 325 detected by the CCD detector 326. FIG. 5 shows a perspective view for the configuration for the transmission version of the terabyte data storage disk. This data storage disk architecture is useable in mini disk format up to Meg disk format for the transmission version, reflection version, and double face/hybrid addressing version. The embodiments of the petabyte data storage disk will now be discussed in greater detail.

Figure 6:
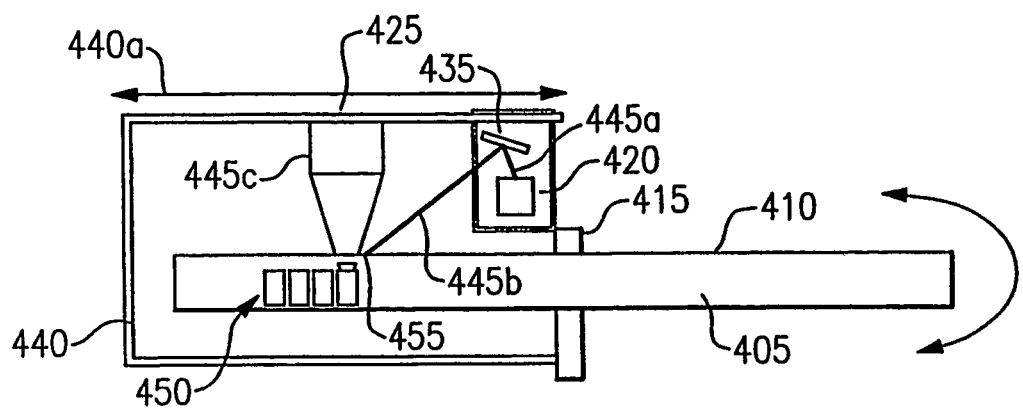
FIG. 6 shows an apparatus for reading information from a terabyte diffractive disk by reflection according to the present invention.

FIG. 6 shows a terabyte data storage disk system 400 which comprises a carriage 440, a coherent light source 420, a MEOMS 435, a disk 410, and a detector 425. The disk 405 spins around the rotation axis 415. The carriage 440 holds the MEOMS actuator 435, the light source 420, and the detector 425 attached thereto so that when the carriage 440 moves in a translation direction 440a a laser beam 445 forms one of a plurality of points 450 on the moving disk surface 410 of the disk 405. The light source 420, e.g., an LED (light emitting diode) creates a light beam 445a which reflects off of MEOMS 435 producing light beam 445b. The light source 420 is associated with an appropriate optical system such as a condenser and collimating lens. The MEOMS 435 based on a predetermined address directs the beam 445b to one of the points containing a subhologram 450. The light beam 445c resulting from diffraction from point 450 contains a packet of information and is received by detector 425.

Referring to FIG. 6, there is shown an optical system 400 comprising a light source 420 and a compact laser, or a laser or light emitting diode (LED), employed to generate a read beam 445a which is used for reading an encoded signal stored on an information-bearing surface 410 of the optical disk 405. The read beam 445a follows a path through the MEOMS 435, and from the MEOMS 435 is reflected to a point of impingement 455 on the information-bearing surface 410 of the optical disk 405. The point of impingement 455 is one of a plurality of points 450 where, as described above, each point forms a packet of information. The read beam 445c is diffracted at the point of impingement 455 from the information-bearing surface 410. The detector unit 445c performs the operation of measuring the intensity of light of the reflected read beam 445c and converting this intensity of light into electrical signals which are further passed along for processing.

Figure 6A:
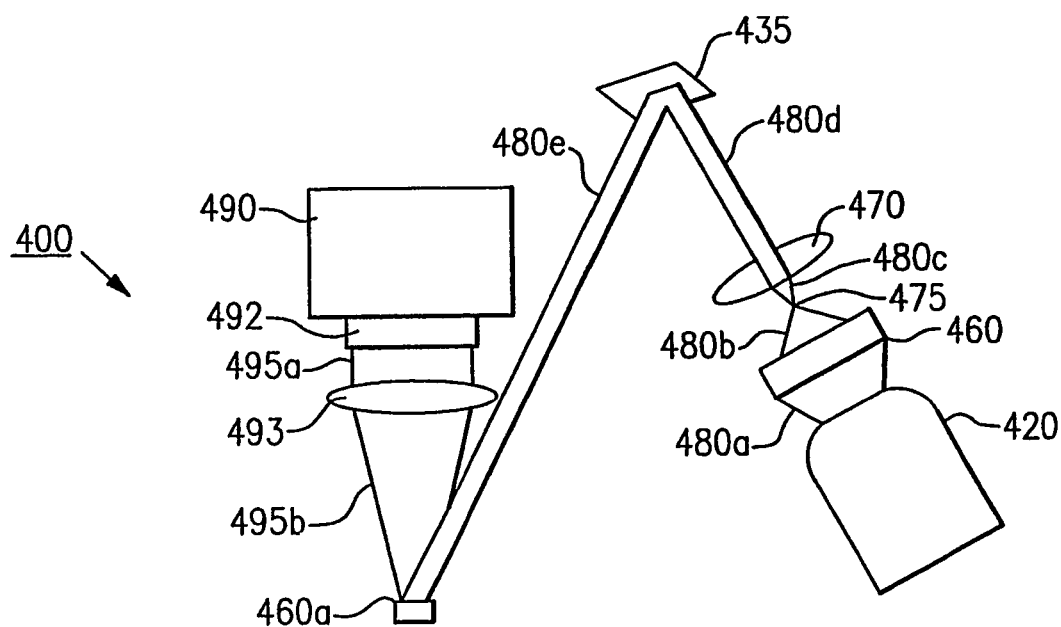
FIG. 6a shows the optical path of an apparatus for reading information from a terabyte diffractive disk by reflection according to the present invention.

Referring to FIG. 6a, the reading system of FIG. 6 is shown with more detail. There is shown the reading system 400 comprising a coherent light source 420 configured to generate the read beam 480a.

The coherent light source 420 in the embodiment of a reading by reflection reader need not be a laser. That is a laser is not necessary to reflection holography, but is necessary for transmission holography. The coherent light source 420 may be a spatially (partially) coherent light source (e.g., LED) in addition to that of a spatially and temporarily coherent source (laser). In addition, in the case of a reflection hologram, a spatially coherent white light (a small light bulb with a simple reflector) can be used. Thus, the light source may be an LED, a micro laser, or any small spatially coherent sources such as a white light bulb with a reflector.

The read beam 480a is focused by condenser lens 460 to a focal point 475. In the case where the coherent light source 420 is a laser, the condenser lens 460 is not used because the laser light is already a parallel beam. The lens 470 is positioned so that its focal point is at the focal point 475 focuses beam 480c to form a parallel beam 480d. The beam 480d diffracts off of the MEOMS 435 resulting in the reflected beam 480e to a position of a track 460a to form the beam 495b. The lens 493 focuses the beam 495b to the beam 495a to the CCD array 492 of the CCD camera 490.

Figure 7:
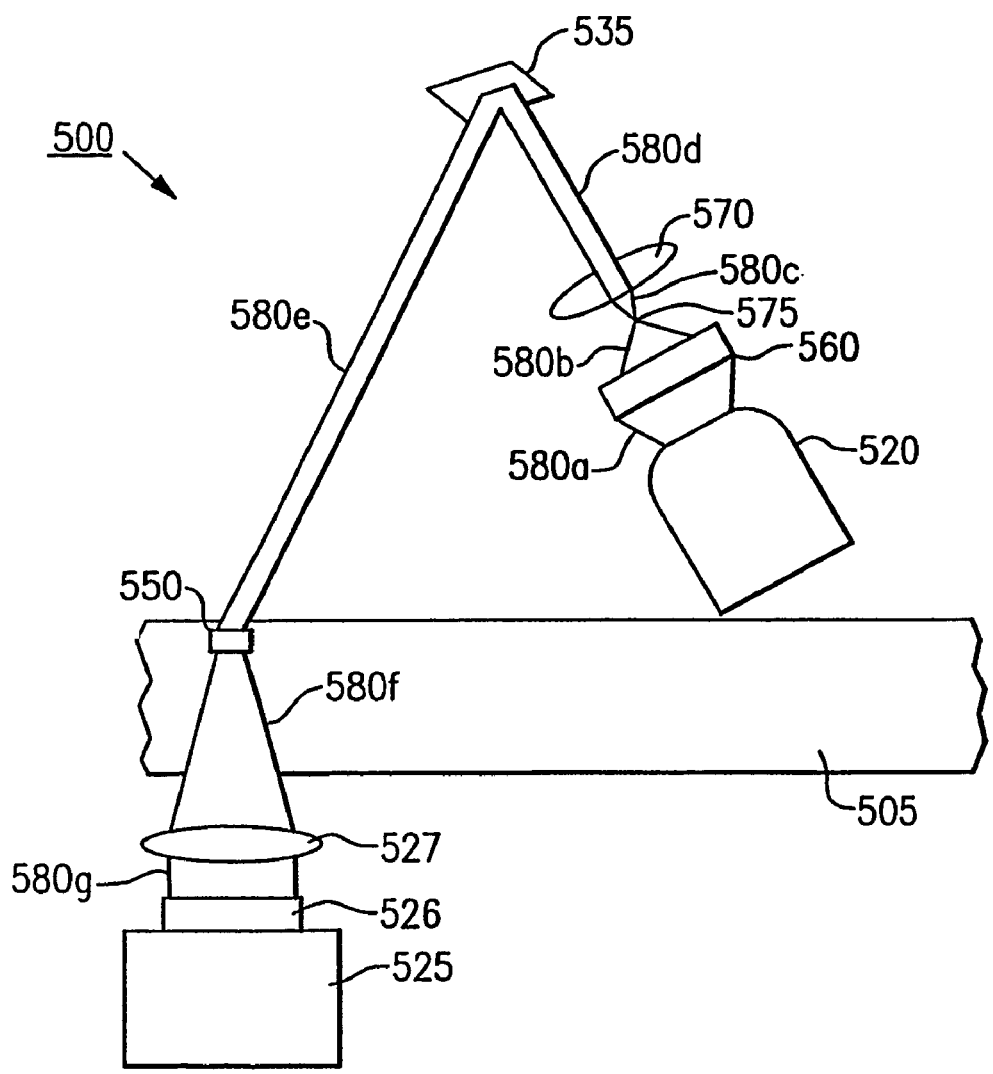
FIG. 7 shows an apparatus for reading information from a terabyte disk by transmission according to the present invention.
Figure 8:
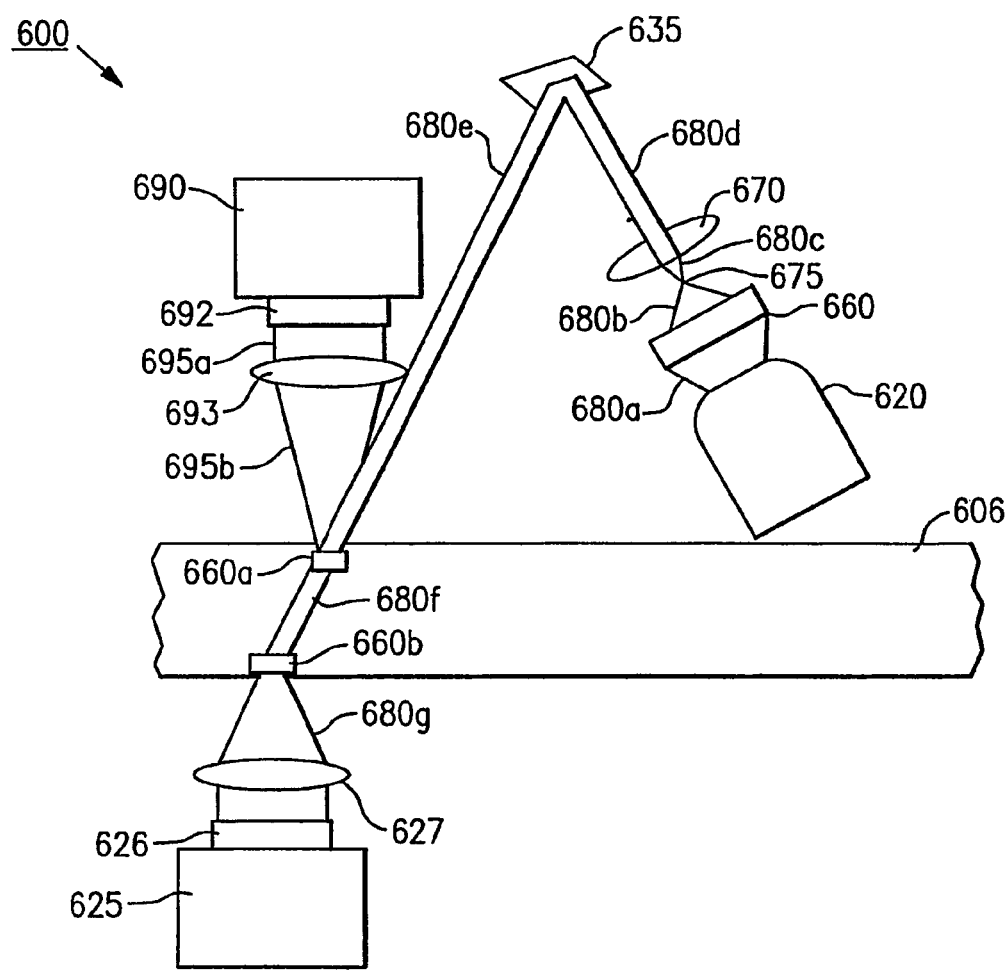
FIG. 8 shows a hybrid apparatus for reading information from a terabyte disk by transmission and reflection according to the present invention.

Referring to FIG. 7, there is shown a reading system 500 comprising a light source 520, preferably a compact laser, configured to generate a read beam 580a. The read beam 580a is focused by condenser lens 560 to a focal point 575. The lens 570 is positioned so that its focal point is at the focal point 575 focuses beam 580c to form the read beam 580d. The read beam 580d reflects off of the MEOMS 535 resulting in the reflected beam 580e to a position of a track 550. A diffractive portion of the read beam 580e transmits through the diffractive disk 505 to form light beam 580f. The read beam 580f is focused by the lens 527 to form the read beam 580g. The read beam 580g is focused onto the detectors 526 of CCD camera 525.

Referring to FIG. 8, there is shown a reading system 600 comprising a light source 620 configured to generate a read beam 680a. The light source 620 may be an LED, a micro laser, or any small spatially coherent sources such as a white light bulb with a reflector. The read beam 680a is focused by condenser lens 660 to a focal point 675. In the case where the coherent light source 620 is a laser, the condenser lens 660 is not used because the laser light is already a parallel beam. The lens 670 positioned so that its focal point is at the focal point 675 focuses beam 680c to form a parallel beam 680d. The beam 680d reflects off of the MEOMS 635 resulting in the reflected beam 680e to a position of a track 660a to form beam 695b. The beam 695b is focused by the lens 693 to form the beam 695a. The beam 695a is focused onto the detectors 692 of the CCD camera 690. Simultaneously, a diffractive portion of the light beam 680e transmits through the diffractive disk 606 to form light beam 680f. The light beam 680f transmits through track 660b where track 660b is different from track 660a. The beam 680g is focused onto the detectors 626 of CCD camera 625

The present invention is not to be limited in scope by the specific embodiments described herein. Indeed, this application is intended to cover and modifications of the present invention, in addition to those described herein, and the present invention is not confined to the details which have been set forth. Thus, the scope of the invention should be determined by the appended claims and their legal equivalents, rather than by the examples given.

The invention claimed is:

1. A diffractive storage system for storing information on a diffractive storage tape, comprising:
   a plurality of object beams focused simultaneously onto a plurality of points of said diffractive storage tape; and
   a coherent light source generating a large reference beam to cover said plurality of points of said diffractive storage tape so as to simultaneously interfere with said plurality of object beams to store a plurality of packets at said plurality of points
   wherein the reference beam is angularly multiplexed to store a plurality of packets at each of said plurality of points.

2. The diffractive storage system of claim 1, wherein said diffractive storage tape has a layer of polypeptide positioned thereon capable of storing information.

3. The diffractive storage system of claim 2, wherein said polypeptide layer is about 30 microns with a tolerance of about 5 microns.

4. The diffractive storage system of claim 1, wherein a substrate of said diffractive storage tape is made of a polymer with a thickness of about 1/10 of a millimeter and has coated thereon a polypeptide layer of about 30 microns with a tolerance of about 5 microns.

5. The diffractive storage system of claim 1, wherein each of said object beams has modulated thereon its own plurality of pixels.

6. The diffractive storage system of claim 1, further comprising:
a rotating mirror deflecting said large reference beam; and
a multiplexing device receiving said deflected large reference beam from said rotating mirror which then directs said large reference beam at one of a plurality of angles to cover said plurality of points of said diffractive storage tape.

7. The diffractive storage system of claim 1, further comprising:
a multiplexing device receiving said large reference beam which directs said large reference beam at one of a plurality of angles to cover said plurality of points of said diffractive storage tape.

8. The diffractive storage system of claim 7, wherein said multiplexing device comprises a plurality of mirrors wherein each of said mirrors directs said large reference beam to one of a plurality of angles so that said reference beam interferes with said plurality of object beams to produce a plurality of packets at said plurality of points.

9. The diffractive storage system of claim 1, further comprising:
a cylindrical lens forming said large reference beam from said coherent light source.

10. The diffractive storage system of claim 1, further comprising:
a plurality of spherical lenses directing said plurality of object beams onto said diffractive storage tape.

11. The diffractive storage system of claim 1, further comprising:
a single spherical lens configured to focus said plurality of object beams onto said diffractive storage tape.

12. The diffractive storage system of claim 1, wherein each of said points is a physical position identifiable by its rectilinear Cartesian coordinate on said diffractive storage tape.

13. The diffractive storage system of claim 1, wherein in a reading phase, said coherent light source generates said large reference beam to illuminate said plurality of points of said diffractive storage tape so as to simultaneously reconstruct a plurality of read beams creating a plurality of packets at said plurality of points, further comprising:
a plurality of detectors configured to receive said plurality of read beams.

14. The diffractive storage system of claim 1, wherein said diffractive storage tape comprises a plurality of tracks, each of said plurality of object beams focusing onto each of said tracks, respectively, so as to interfere with said large reference beam forming said plurality of points thereon.

15. A diffractive storage system for reading information from a diffractive storage tape, comprising:
a coherent light source generating a large reference beam to illuminate a plurality of points of said diffractive storage tape so as to simultaneously create a plurality of read beams reconstructing a plurality of packets at said plurality of points; and
a plurality of detectors configured to receive said plurality of reads beams
wherein the reference beam is angularly multiplexed to read a plurality of packets at each of said plurality of points.

16. The diffractive storage system of claim 15, wherein said diffractive storage tape has a layer of polypeptide positioned thereon capable of storing information.

17. The diffractive storage system of claim 16, wherein said polypeptide layer is about 30 microns with a tolerance of about 5 microns.

18. The diffractive storage system of claim 15, wherein a substrate of said diffractive storage tape is made of a polymer with a thickness of about 1/10 of a millimeter and has coated thereon a polypeptide layer of about 30 microns with a tolerance of about 5 microns.

19. The diffractive storage system of claim 15, further comprising:
a rotating mirror deflecting said large reference beam; and
a multiplexing device receiving said deflected large reference beam from said rotating mirror which then directs said large reference beam at one of a plurality of angles to cover said plurality of points of said diffractive storage tape.

20. The diffractive storage system of claim 15, further comprising:
a multiplexing device receiving said large reference beam which directs said large reference beam at one of a plurality of angles to cover said plurality of points of said diffractive storage tape.

21. The diffractive storage system of claim 15, further comprising:
a plurality of spherical lenses, each of said lenses focusing one of said read beams onto one of said detectors.

22. The diffractive storage system of claim 15, wherein each of said plurality of points has stored therein a plurality of packets of information.

23. The diffractive storage system of claim 15, wherein each of said object beams has modulated thereon its own plurality of pixels.

24. A diffractive storage method for storing information onto a diffractive storage tape comprising a plurality of tracks, comprising the steps of:
forming a large reference laser beam configured to cover said plurality of tracks;
focusing said large reference beam onto said diffractive storage tape at one of a plurality of angles;
focusing a plurality of object beams onto said diffractive storage tape so as to interfere with said large reference beam so that a plurality of packets are stored in said diffractive storage tape; and
focusing said large reference beam onto said diffractive storage tape at another one of said plurality of angles and repeating the previous step so as to store additional packets at the same locations of diffractive storage tape.

25. The diffractive storage method of claim 24, wherein said large reference beam is formed by passing a laser beam through a cylindrical lens.

26. The diffractive storage method of claim 24, wherein said large reference beam is directed onto said diffractive storage tape via one of a plurality of micro-mirrors forming a multiplexing device.

27. The diffractive storage method of claim 24, wherein a rotating mirror directs said large reference beam onto said multiplexing device.

28. The diffractive storage method of claim 24, wherein said plurality of object beams are focused onto said diffractive storage tape using a plurality of spherical lenses.

29. A diffractive storage method for reading information from a diffractive storage tape, comprising the steps of:
   forming a large reference laser beam configured to cover a plurality of points of said diffractive storage tape so as to simultaneously create a plurality of read beams to retrieve a plurality of packets at said plurality of points;
   focusing said large reference beam onto said diffractive storage tape at one of a plurality of angles;
   detecting said plurality of reads beams; and
   focusing said large reference beam onto said diffractive storage tape at another one of said plurality of angles and repeating the previous step so as to retrieve additional packets at said plurality of points.

30. The diffractive storage method of claim 29, further comprising the step of:
   focusing with a plurality of spherical lenses each of said read beams onto one of a plurality of detectors used in the detecting step.

31. The diffractive storage method of claim 29, wherein said diffractive storage tape has a layer of polypeptide thereon capable of storing information.

32. The diffractive storage method of claim 29, wherein a substrate of said diffractive storage tape is made of polymer with a thickness of about 1/10 of a millimeter and has coated thereon a polypeptide layer of about 30 microns with a tolerance of about 5 microns.

33. The diffractive storage method of claim 29, wherein each of said read beams has reconstructed its own plurality of pixels.

34. The diffractive storage method of claim 29, further comprising the steps of:
   deflecting with a rotating mirror said large reference beam; and
   receiving said deflected large reference beam by a multiplexing device from said rotating mirror which then directs said large reference beam at one of a plurality of angles to cover said plurality of points of said diffractive storage tape.

35. The diffractive storage method of claim 29, further comprising the steps of:
   receiving said large reference beam by a multiplexing device which directs said large reference beam at one of a plurality of angles to cover said plurality of points of said diffractive storage tape.

36. The diffractive storage method of claim 29, wherein said large reference beam is formed by passing a coherent laser beam through a cylindrical lens.

37. A diffractive storage system for reading information by reflection from a diffractive storage disk having a plurality of concentric tracks storing said information, comprising:
   a coherent light source configured to generate a read beam;
   a plurality of micro-mirrors directing said read beam to a point on one of said plurality of tracks; and
   a detector configured to detect a diffractive portion of said read beam reflected from said diffractive storage disk from said point on one of said tracks of said diffractive storage disk
   wherein each of said micro-mirrors directs said read beam to a selected one of a plurality of angles so that said read beam impinges on said point of said optical disk at said selected angle in order to illuminate a packet.

38. The diffractive storage system of claim 37, wherein said coherent light source comprises a laser.

39. The diffractive storage system of claim 37, wherein said coherent light source comprises a partially coherent light source.

40. The diffractive storage system of claim 39, wherein said partially coherent light source comprises a light-emitting diode.

41. The diffractive storage system of claim 39, wherein said partially coherent light source comprises a white light source.

42. The diffractive storage system of claim 37, further comprising:
   a lens combination configured to collimate said read beam from said coherent light source when said coherent light source is a partially coherent light source so that said read beam arrives at said array of micro mirrors in a parallel form.

43. The diffractive storage system of claim 42, wherein said lens combination comprises a condenser which focuses said read beam from said light source to a focal point when said light source is a partially coherent light source and a lens situated at said focal point converting said read beam to a parallel form.

44. The diffractive storage system of claim 37, wherein said detector is a CCD camera.

45. The diffractive storage system of claim 37, wherein said plurality of micro-mirrors is a micro electro-optical mechanical system (MEOMS).

46. The diffractive storage system of claim 37, wherein said diffractive storage disk has a layer of polypeptide positioned thereon capable of storing information.

47. The diffractive storage system of claim 46, wherein said polypeptide layer is about 30 microns with a tolerance of about 5 microns.

48. The diffractive storage system of claim 37, wherein a substrate of said diffractive storage disk is made of a substrate of the polymer family with a thickness of about 1/10 of a millimeter and has coated thereon a polypeptide layer of about 30 microns with a tolerance of about 5 microns.

49. The diffractive storage system of claim 37, wherein each of said micro-mirrors directs said read beam to a selected one of a plurality of angles so that said read beam impinges on said point of said optical disk at said selected angle in order to illuminate a packet.

50. The diffractive storage system of claim 37, wherein said point is a physical position identifiable by its rectilinear coordinate on said diffractive storage disk.

51. A diffractive storage method for reading information by reflection from a diffractive storage disk having a plurality of tracks, comprising the steps of:
   generating a light read beam from a light source; directing with a plurality of micro-mirrors said read beam to a point on one of said plurality of tracks at one of a plurality of angles; and
   detecting a diffractive portion of said read beam reflected by said diffractive storage disk from said point on said one of said tracks of said diffractive storage disk.

52. The diffractive storage method of claim 51, wherein said light source comprises a laser.

53. The diffractive storage method of claim 51, wherein said light source comprises a light-emitting diode.

54. The diffractive storage method of claim 51, wherein said light source comprises a white light source.

55. The diffractive storage method of claim 51, wherein when said read beam is selected from one of a light-emitting diode and a white light source and said read beam is made parallel using a condenser which focuses said read beam from said light source to a focal point and a lens situated at said focal point converting said read beam to said parallel form and when said read beam is a laser there is no said condenser because said read beam is already parallel.

56. The diffractive storage method of claim 51, wherein said detecting of said diffractive portion of said light beam is accomplished using a CCD camera.

57. The diffractive storage method of claim 51, wherein said plurality of micro-mirrors is a micro electro-optical mechanical system (MEOMS).

58. The diffractive storage method of claim 51, wherein said diffractive storage disk has a layer of polypeptide positioned thereon capable of storing information.

59. The diffractive storage method of claim 58, wherein said polypeptide layer is about 30 microns with a tolerance of about 5 microns.

60. The diffractive storage method of claim 51, wherein a substrate of said diffractive storage disk is made of a substrate of the polymer family with a thickness of about $1/10$ of a millimeter and has coated thereon a polypeptide layer of about 30 microns with a tolerance of about 5 microns.

61. The diffractive storage method of claim 51, wherein each of said micro-mirrors directs said light beam to a selected one of a plurality of angles so that said reference beam impinges on said point of said optical disk at said selected angle in order to illuminate a packet.

62. The diffractive storage method of claim 51, wherein said point is a physical position identifiable by its rectilinear coordinate on said diffractive storage disk.

63. A diffractive storage system for reading information by transmission from a diffractive storage disk having a plurality of tracks, comprising:
a coherent laser source configured to generate a read beam; a plurality of micro-mirrors directing said read beam to a point on one of said plurality of tracks; and
a detector configured to detect a diffractive portion of said read beam transmitted through said diffractive storage disk from said point on one of said tracks of said diffractive storage disk
wherein each of said micro-mirrors directs said read beam to a selected one of a plurality of angles so that said read beam impinges on said point of said optical disk at said selected angle in order to illuminate a packet.

64. The diffractive storage system of claim 63, further comprising:
a lens combination configured to collimate said read beam from said coherent laser source so that said read beam arriving at said array of micro-mirrors is a parallel beam.

65. The diffractive storage system of claim 64, wherein said lens combination comprises a condenser which focuses said read beam from said coherent laser source to a focal point and a lens situated at said focal point converting said read beam to a parallel beam.

66. The diffractive storage system of claim 63, wherein said detector is a CCD camera.

67. The diffractive storage system of claim 63, wherein said plurality of micro-mirrors is a micro electro-optical mechanical system (MEOMS).

68. The diffractive storage system of claim 63, wherein said diffractive storage disk has a layer of polypeptide positioned thereon capable of storing information.

69. The diffractive storage system of claim 68, wherein said polypeptide layer is about 30 microns with a tolerance of about 5 microns.

70. The diffractive storage system of claim 63, wherein a substrate of said diffractive storage disk is made of a polymer with a thickness of about $1/10$ of a millimeter and has coated thereon a polypeptide layer of about 30 microns with a tolerance of about 5 microns.

71. The diffractive storage system of claim 63, wherein each of said micro-mirrors directs said read beam to a selected one of a plurality of angles so that said read beam impinges on said point of said optical disk at said selected angle in order to illuminate a packet.

72. The diffractive storage system of claim 63, wherein said point is a physical position identifiable by its rectilinear coordinate on said diffractive storage disk.

73. A diffractive storage method for reading information by transmission from a diffractive storage disk having a plurality of tracks, comprising the steps of:
generating a parallel coherent read beam; directing with a plurality of micro mirrors said read beam to a point on one of said plurality of tracks at one of a plurality of angles; and
detecting a diffractive portion of said read beam transmitted through said diffractive storage disk from said point on said one of said tracks of said diffractive storage disk.

74. The diffractive storage method of claim 73, wherein said read beam is made parallel using a condenser which focuses said read beam from a coherent laser source to a focal point and a lens situated at said focal point converting said read beam to said parallel beam.

75. The diffractive storage method of claim 73, wherein said detecting of said diffractive portion of said read beam is accomplished using a CCD camera.

76. The diffractive storage method of claim 73, wherein said plurality of micro-mirrors is a micro electro-optical mechanical system (MEOMS).

77. The diffractive storage method of claim 73, wherein said diffractive storage disk has a layer of polypeptide positioned thereon capable of storing information.

78. The diffractive storage method of claim 77, wherein said polypeptide layer is about 30 microns with a tolerance of about 5 microns.

79. The diffractive storage method of claim 73, wherein a substrate of said diffractive storage disk is made of a polymer with a thickness of about $1/10$ of a millimeter and has coated thereon a polypeptide layer of about 30 microns with a tolerance of about 5 microns.

80. The diffractive storage method of claim 73, wherein each of said micro-mirrors directs said read beam to a selected one of a plurality of angles so that said read beam impinges on said point of said optical disk at said selected angle in order to illuminate a packet.

81. The diffractive storage method of claim 73, wherein said point is a physical position identifiable by its rectilinear coordinate on said diffractive storage disk.

82. A hybrid diffractive storage system for reading information from a diffractive storage disk having a plurality of tracks on each side of said storage disk, comprising:
a coherent light source configured to generate a read beam;
a plurality of micro-mirrors directing said read beam to a point on one of said plurality of tracks; a first detector configured to detect a diffractive portion of said read beam reflected from said point of one of said tracks; and a second detector configured to detect a diffractive portion of said read beam transmitted through said diffractive storage disk from another one of said points on one of said tracks on the other side of said diffractive storage disk wherein each of said micro-mirrors directs said read beam to a selected one of a plurality of angles so that said read beam impinges on said point of said optical disk at said selected angle in order to illuminate a packet of information.

83. The diffractive storage system of claim 82, further comprising:

a lens combination configured to collimate said read beam from said coherent laser source so that said read beam arriving at said array of micro-mirrors is a parallel beam and when said read beam is from a laser source there is no said condenser because said read beam is already parallel.

84. The diffractive storage system of claim 83, wherein said lens combination comprises a condenser which focuses said read beam from said coherent light source to a focal point and a lens situated at said focal point converting said read beam to a parallel form.

85. The diffractive storage system of claim 82, wherein said first and second detectors are CCD cameras.

86. The diffractive storage system of claim 82, wherein said plurality of micro-mirrors is a micro electro-optical mechanical system (MEOMS).

87. The diffractive storage system of claim 82, wherein said diffractive storage disk has a layer of polypeptide positioned on each side of said disk capable of storing information.

88. The diffractive storage system of claim 87, wherein said polypeptide layer is about 30 microns with a tolerance of about 5 microns.

89. The diffractive storage system of claim 82, wherein a substrate of said diffractive storage disk is made of a substrate of polymer with a thickness of about $\frac{1}{10}$ of a millimeter and has coated thereon a polypeptide layer of about 30 microns with a tolerance of about 5 microns.

90. The diffractive storage system of claim 82, wherein each of said micro-mirrors directs said read beam to a selected one of a plurality of angles so that said read beam impinges on said point of said optical disk at said selected angle in order to illuminate a packet of information.

91. The diffractive storage system of claim 82, wherein said point is a physical position identifiable by its rectilinear coordinate on said diffractive storage disk.

92. A hybrid diffractive storage method for reading information from a diffractive storage disk having a plurality of tracks on each side of said disk, comprising the steps of:

generating a coherent read beam; directing with a plurality of micro-mirrors said read beam to a point on one of said plurality of tracks at one of a plurality of angles;

detecting a first diffractive portion of said light beam reflected by said diffractive storage disk from one of said points on one of said tracks of said diffractive storage disk; and detecting a second diffractive portion of said read beam transmitted through said diffractive storage disk from another one of said points on said tracks of said diffractive storage disk.

93. The diffractive storage method of claim 92, wherein said read beam is made parallel using a condenser which focuses said read beam from said coherent laser source to a focal point and a lens situated at said focal point converting said read beam to said parallel form and when said read beam is from a laser source there is no said condenser because said read beam is already parallel.

94. The diffractive storage method of claim 92, wherein said detecting of said first and second diffractive portions of said light beam is accomplished using CCD cameras.

95. The diffractive storage method of claim 92, wherein said plurality of micro-mirrors is a micro electro-optical mechanical system (MEOMS).

96. The diffractive storage method of claim 92, wherein said diffractive storage disk has a layer of polypeptide positioned on each side of said disk capable of storing information.

97. The diffractive storage method of claim 96, wherein said polypeptide layer is about 30 microns with a tolerance of about 5 microns.

98. The diffractive storage method of claim 92, wherein a substrate of said diffractive storage disk is made of a polymer with a thickness of about $\frac{1}{10}$ of a millimeter and has coated thereon a polypeptide layer of about 30 microns with a tolerance of about 5 microns.

99. The diffractive storage method of claim 92, wherein each of said micro-mirrors directs said read beam to a selected one of a plurality of angles so that said read beam impinges on said point of said optical disk at said selected angle in order to illuminate a packet.

100. The diffractive storage method of claim 92, wherein said point is a physical position identifiable by its Cartesian rectilinear coordinate on said diffractive storage disk.

* * * * *